United States Patent Office 3,507,868
Patented Apr. 21, 1970

3,507,868
IMIDAZO[2,1-b]THIAZOLES AND
THIAZOLO[3,2-a]PYRIMIDINES
Robert E. Manning, Mountain Lakes, N.J., assignor to Sandoz-Wander, Inc., Hanover, N.J., a corporation of Delaware
No Drawing. Continuation-in-part of application Ser. No. 727,363, May 7, 1968. This application Oct. 21, 1968, Ser. No. 769,417
Int. Cl. C07d 51/46, 91/52
U.S. Cl. 260—251
14 Claims

ABSTRACT OF THE DISCLOSURE

Indeno, naphtho and benzocyclohepta imidazo thiazoles and indeno, naphtho and benzocyclohepta thiazolo pyrimidines, e.g., 2,3 - dihydro-9H-indeno[2′,1′:2,3]imidazo [2,1 - b]thiazole, 3,4,10,11 - tetrahydro - 2H - naphtho [2′,1′:2,3]thiazolo[3,2 - a]pyrimidine and 2,3,10,11 - 9H-hexahydro benzocyclohepta[5,6-d]imidazo[2,1-b]thiazole are prepared. These compounds are useful as anorexics.

---

This application is a continuation-in-part of application Ser. No. 727,363, filed May 7, 1968 and now abandoned.

This invention relates to novel heterocyclic compounds. More particularly, this invention pertains to novel indeno and naphtho imidazo[2,1-b]thiazoles and thiazolo[3,2-a]pyrimidines and acid addition salts thereof. This invention also pertains to methods for preparing these compounds, to intermediates therefor and to methods for preparing the intermediates.

The compounds of the present invention may be represented by the following structural formula:

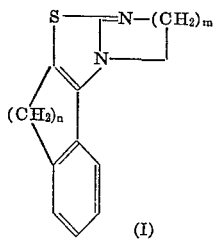

where $m$ represents 1 or 2 and
$n$ represents 1, 2 or 3.

According to one aspect of the invention, novel compounds of the Formula I are prepared in accordance with the following reaction scheme:

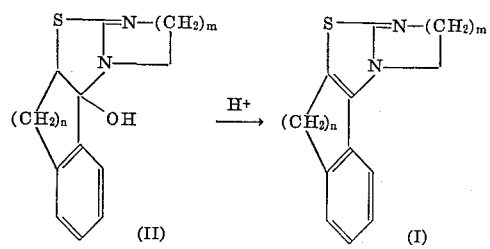

where $m$ and $n$ are as defined above.

Compounds of Formula I are prepared from the compounds of Formula II or their acid addition salts by treatment with acid at about room temperature to about 100° C., conveniently at reflux temperature. The acid used may be a strong acid, for instance a strong mineral acid such as a hydrohalic acid, e.g., hydrochloric acid and hydrobromic acid, or sulfuric acid, phosphoric acid and the like. When a strong acid addition salt of the compounds of Formula II is utilized, a weaker acid, e.g., acetic acid, propionic acid, and the like may be used. The above process always provides an acid addition salt of compounds of the Formula I, the particular salt made being dictated by the acid addition salt of Formula II utilized, if any, and the acid used for the dehydrolysis. Solvents such as lower alkanol, e.g., ethanol or isopropanol, or water and the like may be used in connection with the above process. However, use of such solvent is not necessary and excess acid may be used in lieu thereof when the reactant (II) is sufficiently soluble therein. Preferably, water as solvent is not utilized when a weak acid such as acetic acid is used. The solvents and temperatures mentioned above are not critical in obtaining the product (II). Conventional recovery techniques may be used.

The compounds of Formula II may be prepared in accordance with the following reaction scheme.

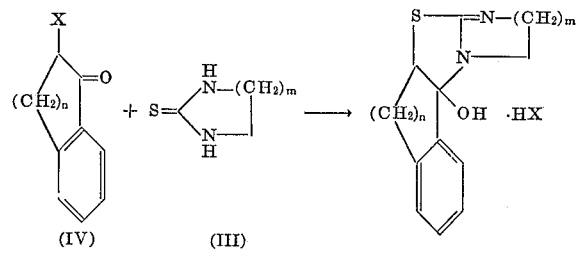

where X is bromo or chloro and $m$ and $n$ are as defined above. The product obtained from the above reaction is the hydrohalide acid addition salt of the compound of Formula II and is either the hydrobromide or hydrochloride depending upon the nature of X. The acid addition salt of the compound of Formula I or II is readily converted either to the free base by conventional techniques, e.g., by dissolution of the salt in water and precipitation using a base such as sodium hydroxide, or it may be converted to another acid addition salt by salification of the free base.

The compounds of Formula II are prepared by treating a compound of Formula IV, e.g., 2-bromoindan-1-one, with a compound of Formula III, e.g., propylenethiourea, in solvent at a temperature of about 0° to about 80° C., preferably about 20° to about 40° C. The solvents which may be utilized include acetone, alcohol such as lower alkanols, e.g., propanol or ethanol, or tetrahydrofuran and the like. The particular solvents and temperatures used are not critical in obtaining the product. The compounds of Formula II are recovered using conventional techniques.

The compounds of Formulas III and IV are known and may be prepared according to methods disclosed in the literature.

The compounds of Formula I are useful because they possess pharmacological activity in animals. More particularly the compounds have CNS activity, and are particularly useful as anorexics as indicated by their activity in rats given 25 mg. per kilogram of active compound and tested using the free feeding method described by Randall et al. (J.P.E.T., 129:163, 1960). Furthermore, these compounds of Formula I may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

3,507,868

3

When so utilized, these compounds may be combined with a pharmaceutically acceptable carrier or adjuvant and may be administered orally or parenterally. For this use, the dosage will vary depending upon the mode of administration utilized and the particular compound employed. However, in general, satisfactory results are obtained when the compounds are administered at a daily dosage of from about 1–20 mg. per kilogram of animal body weight, preferably given in divided doses, e.g., 2 to 4 times a day or in sustained release form. For most large mammals the total daily dosage is from about 5–150 mg. Suitable dosage forms comprise from about 1.25 mg. to about 75 mg. of the active compound in admixture with solid or liquid pharmaceutically acceptable carrier or diluents.

A representative formulation suitable for oral administration is a tablet prepared by standard tabletting techniques which contains the following.

| Ingredient: | Parts by weight |
| --- | --- |
| 2,3,9,10 - tetrahydro - naphtho[2',1':2,3]imidazo[2,1-b]thiazole | 10 |
| Tragacanth | 2 |
| Lactose | 79.5 |
| Corn starch | 5 |
| Talcum | 3 |
| Magnesium stearate | 0.5 |

EXAMPLE 1

4a-hydroxy-2,3,9,9a-tetrahydro-4aH-indeno[2',1':2,3]imidazo[2,1-b]thiazole hydrobromide

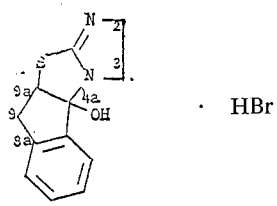

To a suspension of ethylenethiourea (4.8 g.) in acetone (250 ml.) is added 2-bromoindan-1-one (9.45 g.) and the resultant mixture is stirred 36 hours. The resultant solid is collected by filtration to give 13.7 g. of 4a-hydroxy-2,3,9,9a - tetrahydro - 4aH - indeno[2',1':2,3]imidazo-[2,1-b]thiazole hydrobromide; M.P. 173–175° C.

EXAMPLE 2

2,3-dihydro-9H-indeno[2',1':2,3]imidazo[2,1-b]thiazole hydrochloride

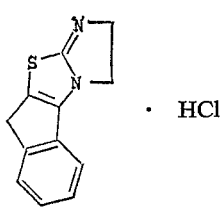

A mixture of 4a - hydroxy-2,3,9,9a-tetrahydro-4aH-indeno[2',1:2,3]imidazo[2,1-b]thiazole (7 g.), methanol (100 ml.) and concentrated hydrochloric acid (20 ml.) is refluxed 72 hours. The solution is evaporated in vacuo and the residue crystallized from methanol-ether (1:2) to give 4.2 g. of 2,3-dihydro-9H-indeno[2',1':2,3]imidazo[2,1-b]thiazole hydrochloride; M.P. 264–265° C. with decomposition.

4

EXAMPLE 3

5a-hydroxy-3,4,10,10a-tetrahydro-2H,5aH-indeno-[2',1':2,3]thiazolo[3,2-a]pyrimidine hydrobromide

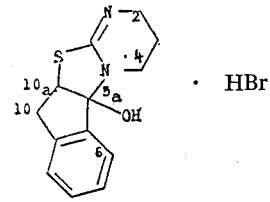

To a stirred suspension of propylene-thiourea (5.45 g.) in acetone (250 ml.) is added 2-bromoindan-1-one (9.45 g.). The resultant mixture is stirred for 36 hours. The resultant solid is collected by filtration to afford 14.1 g. of 5a - hydroxy - 3,4,10,10a - tetrahydro - H,5aH-indeno [2',1':2,3]thiazolo[3,2-a]pyrimidine hydrobromide; M.P. 215–217° C. with decomposition.

EXAMPLE 4

3,4-dihydro-2H,10H-indeno[2',1':2,3]thiazolo[3,2-a]pyrimidine hydrochloride

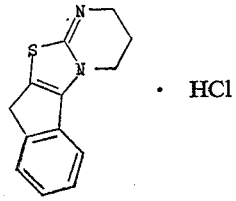

A mixture of 5a - hydroxy-3,4,10,10a-tetrahydro-2H,5aH-indeno[2',1':2,3]thiazolo[3,2-a]pyrimidine (7.0 g.), methanol (100 ml.) and concentrated hydrochloric acid (20 ml.) is refluxed 72 hours. The solution is evaporated in vacuo and the residue crystallized from methanol-ether (1:3) to give 5.2 g. of 3,4 - dihydro - 2H,10H-indeno-[2',1':2,3]thiazolo[3,2-a]pyrimidine hydrochloride; M.P. 310–312° C. with decomposition.

EXAMPLE 5

4a-hydroxy-2,3,4a,9,10,10a-hexahydro naphtho[2',1':2,3]imidazo[2,1-b] thiazole hydrobromide

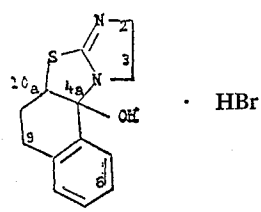

A solution of 2-bromo-1-tetralone (13.0 g.) in acetone (50 ml.) is added to a stirred suspension of ethylenethiourea (5.9 g.) in acetone (200 ml.). The reaction mixture is stirred for 48 hours and the resultant solid is collected by filtration to afford 13.8 g. of 4a-hydroxy-2,3,4a,9,10, 10a-hexahydro - naphtho[2',1':2,3]imidazo[2,1-b]thiazole hydrobromide; M.P. 255–256° C.

EXAMPLE 6

2,3,9,10-tetrahydro-naphtho[2',1':2,3]imidazo[2,1-b]thiazole hydrochloride

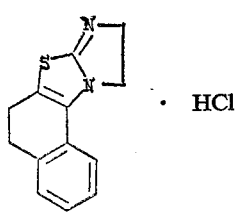

A mixture of 4a-hydroxy-2,3,4a,9,10,10a-hexahydro-naptho[2',1':2,3]imidazo[2,1-b]thiazole (7.5 g.), methanol (100 ml.) and concentrated hydrochloric acid (20 ml.) is refluxed for 72 hours. The solution is evaporated and the residue crystallized from methanol-ether (1:3) to give 7.8 g. of 2,3,9,10-tetrahydro-naphtho[2',1':2,3]imidazo[2,1-b]thiazole hydrochloride; M.P. 249–256° C. with decomposition.

EXAMPLE 7

5a-hydroxy-3,4,5a,10,11,11a-hexahydro-2H-naphtho-[2',1':2,3]thiazolo[3,2-a]pyrimidine hydrobromide

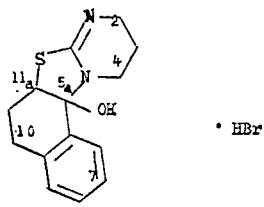

A solution of 2-bromo-1-tetralone (13.00 g.) in acetone (50 ml.) is added to a stirred suspension of propylenethiourea (6.7 g.) in acetone (200 ml.) and the resultant mixture is stirred for 48 hours. The resultant solid is collected by filtration to afford 19.5 g. of 5a-hydroxy-3,4,5a,10,11,11a-hexahydro - 2H - naphtho[2',1':2,3]thiazolo[3,2-a]pyrimidine hydrobromide; M.P. 261–263° C.

EXAMPLE 8

3,4,10,11-tetrahydro-2H-naphtho[2',1':2,3]thiazolo-[3,2-a]pyrimidine hydrochloride

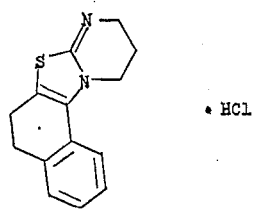

A mixture of 5a-hydroxy-3,4,5a,10,11,11a-hexahydro-2H-naphtho[2',1':2,3]thiazolo[3,2-a]pyrimidine (9.5 g.), methanol (100 ml.) and concentrated hydrochloric acid (20 ml.) is refluxed for 7 hours. The solution is evaporated in vacuo and the residue is crystallized from methanol-ether (1:3) to give 9.9 g. of 3,4,10,11-tetrahydro-2H-naphtho[2',1':2,3]thiazolo[3,2 - a]pyrimidine hydrochloride; M.P. 261–263° C. with decomposition.

EXAMPLE 9

4a-hydroxy-2,3,9,10,11,11a-hexahydro-4aH-benzocyclohepta[5,6-d]imidazo[2,1-b]thiazole hydrobromide

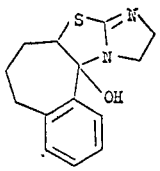

When the process described in Example 1 is carried out and 2-bromo-1-benzosuberone is used in place of 2-bromoindan-1-one, the title compound is obtained; M.P. 187–189° C.

EXAMPLE 10

5a - hydroxy - 3,4,10,11,12,12a-hexahydro-2H,5aH-benzocyclohepta-[5',6':4,5]thiazolo[3,2-a]pyrimidine hydrobromide

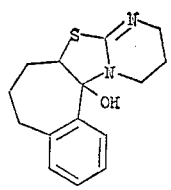

When the process described in Example 3 is carried out a 2-bromo-1-benzosuberone is used in place of 2-bromoindan-1-one, the title compound is obtained; M.P. 266–267° C.

EXAMPLE 11

2,3,10,11-hexahydro-9H-benzocyclohepta[5,6-d]imidazo-[2,1-b]thiazole hydrochloride

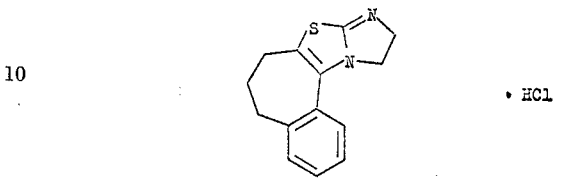

When the process described in Example 2 is carried out and 4a - hydroxy - 2,3,9,10,11,11a - hexahydro-4aH-benzocyclohepta[5,6-d]imidazo[2,1-b]thiazole is used in place or 4a-hydroxy-2,3,9,9a-tetrahydro-4aH-indeno[2',1':2,3]imidazo[2,1-b]thiazole, the title compound is obtained; M.P. 266–267° C.

EXAMPLE 12

3,4,11,12-tetrahydro-2H,10H-benzocyclohepta[5',6':4,5]thiazolo[3,2-a]pyrimidine hydrochloride

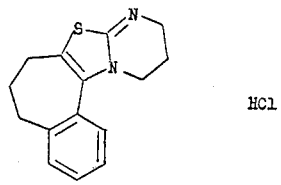

When the process described in Example 2 is carried out and 5a-hydroxy-3,4,10,11,12,12a-hexahydro-2H,5aH-benzocyclohepta - [5',6':4,5]thiazolo[3,2-a]pyrimidine is used in place of 4a-hydroxy-2,3,9,9a-tetrahydro-4aH-indeno[2'1':2,3]imidazo[2,1-b]thiazole, the title compound is obtained; 270–271° C.

What is claimed is:

1. A compound of the formula

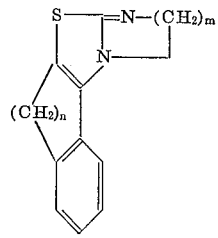

where
 m represents 1 or 2, and
 n represents 1, 2 or 3, or a pharmaceutically acceptable acid addition salt thereof.

2. A compound according to claim 1 which is 2,3-dihydro-9H-indeno[2',1':2,3]imidazo[2,1-b]thiazole or a pharmaceutically acceptable acid addition salt thereof.

3. A compound according to claim 1 which is 3,4-dihydro-2H,10H-indeno[2',1':2,3]thiazolo[3,2 - a]pyrimidine or a pharmaceutically acceptable acid addition salt thereof.

4. A compound according to claim 1 which is 2,3,9,10-tetrahydro-naphtho[2',1':2,3]imidazo[2,1 - b]thiazole or a pharmaceutically acceptable acid addition salt thereof.

5. A compound according to claim 1 which is 3,4,10,11-tetrahydro - 2H - naphtho[2',1':2,3]thiazolo[3,2-a]pyrimidine or a pharmaceutically acceptable acid addition salt thereof.

6. A compound according to claim 1 which is 2,3,10,11-hexahydro - 9H - benzocyclohepta[5,6-d]imidazo[2,1-b]thiazole or a phermaceutically acceptable acid addition salt thereof.

7. A compound according to claim 1 which is 3,4,11,12-tetrahydro - 2H,10H - benzocyclohepta[5',6':4,5]thiazolo

[3,2-a]pyrimidine or a pharmaceutically acceptable acid addition salt thereof.

8. A compound of the formula

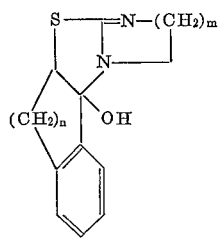

where m represents 1 or 2, and
n represents 1, 2 or 3, or an acid addition salt thereof.

9. A compound according to claim 8 which is 4a-hydroxy - 2,3,9,9a - tetrahydro - 4aH - indeno[2',1':2,3]imidazo[2,1-b]thiazole or an acid addition salt thereof.

10. A compound according to claim 8 which is 5a-hydroxy - 3,4,10,10a - tetrahydro - 2H - 5aH - indeno[2',1':2,3]thiazolo[3,2-a]pyrimidine or an acid addition salt thereof.

11. A compound according to claim 8 which is 4a-hydroxy - 2,3,4a-9,10,10a - hexahydro - naphtho[2',1':2,3]imidazo[2,1-b]thiazole or an acid addition salt thereof.

12. A compound according to claim 8 which is 5a-hydroxy - 3,4,5a,10,11,11a - hexahydro - 2H - naphtho[2',1':2,3]thiazolo[3,2-a]pyrimidine or an acid addition salt thereof.

13. A compound according to claim 8 which is 4a-hydroxy - 2,3,9,10,11,11a - hexahydro - 4aH - benzocyclohepta[5,6-d]imidazo[2,1-b]thiazole or an acid addition salt thereof.

14. A compound according to claim 8 which is 5a-hydroxy - 3,4,10,11,12,12a - hexahydro - 2H,5aH - benzocyclohepta[5',6':4,5]thiazolo[3,2-a]pyrimidine or an acid addition salt thereof.

References Cited
UNITED STATES PATENTS 3,169,970  2/1965  Snyder _____ 260—306.8

ALEX MAZEL, Primary Examiner

R. V. RUSH, Assistant Examiner

U.S. Cl. X.R.

260—306.7; 424—251, 270